(12) United States Patent
Ting et al.

(10) Patent No.: US 10,666,795 B2
(45) Date of Patent: *May 26, 2020

(54) TELEPHONE NUMBER SELECTION

(71) Applicant: TEXTNOW, INC., Waterloo (CA)

(72) Inventors: Derek Ting, Waterloo (CA); Michael Kovacevic, Waterloo (CA); Jonathan Dennis Halk, Waterloo (CA)

(73) Assignee: TEXTNOW, INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,288

(22) Filed: Aug. 23, 2019

(65) Prior Publication Data
US 2019/0379787 A1    Dec. 12, 2019

Related U.S. Application Data

(63) Continuation of application No. 16/366,744, filed on Mar. 27, 2019, now Pat. No. 10,432,786.

(60) Provisional application No. 62/649,921, filed on Mar. 29, 2018.

(51) Int. Cl.
*H04M 3/42* (2006.01)
*H04L 29/12* (2006.01)
*G06F 16/903* (2019.01)

(52) U.S. Cl.
CPC .... *H04M 3/42263* (2013.01); *H04L 61/2061* (2013.01); *G06F 16/90344* (2019.01); *H04L 61/605* (2013.01); *H04M 3/42306* (2013.01); *H04M 2242/30* (2013.01)

(58) Field of Classification Search
CPC .......... H04M 3/42263; H04M 3/42306; H04L 61/2061; H04L 61/605; G06F 16/90344
See application file for complete search history.

(56) References Cited

U.S. PATENT DOCUMENTS

| | | | |
|---|---|---|---|
| 5,428,666 A | | 6/1995 | Fyfe et al. |
| 7,120,236 B1 * | | 10/2006 | Schneider .............. G06Q 99/00 379/201.01 |
| 8,631,016 B2 * | | 1/2014 | Gudlavenkatasiva ....................... G06F 16/90344 707/748 |
| 2010/0239084 A1 * | | 9/2010 | Brown .............. H04M 3/42306 379/218.01 |
| 2012/0257741 A1 * | | 10/2012 | Gudlavenkatasiva ....................... H04M 3/229 379/218.01 |

(Continued)

OTHER PUBLICATIONS

USPTO, Notice of Allowance and Fee(s) Due, dated Jun. 6, 2019, U.S. Appl. No. 16/366,744.

(Continued)

*Primary Examiner* — Nafiz E Hoque
(74) *Attorney, Agent, or Firm* — Perry + Currier Inc.

(57) ABSTRACT

An example method of assigning a telephone number to a user account in a communications system is provided. The method includes obtaining a mnemonic seed and obtaining a subset of telephone numbers filtered from a global telephone number pool based on the mnemonic seed. The alphanumeric representation of each telephone number in the subset is within a threshold Hamming distance of the mnemonic seed. The method further includes receiving an indication of a selected telephone number from the subset and assigning the selected telephone number to the user account.

20 Claims, 5 Drawing Sheets

(56) References Cited

U.S. PATENT DOCUMENTS

2015/0066633 A1    3/2015  Agrawal et al.
2015/0310509 A1*  10/2015  Quimby ............. G06Q 30/0283
                                                        705/7.35

OTHER PUBLICATIONS

WikiHow, "How to Get a Google Voice Phone Number", Mar. 19, 2018, URL:https//www.wikihow.com/Get-a-Google-Voice-Phone-Number.
U.S. Appl. No. 16/366,744, Telephone Number Selection, filed Mar. 27, 2019.

* cited by examiner

TELEPHONE NUMBER SELECTION

FIELD

The present invention relates to electronic communications and in particular to telephone number selection.

BACKGROUND

A telephone network operator ("Carrier") is a communications services provider that may have a fixed and/or wireless network infrastructure to provide communications services to its customers. A Carrier may utilize a combination of any number of technologies including those wireless technologies provided by any number of mobile network providers (such as cellular, LTE™) and those provided by any number of consumer establishments where Wi-Fi®, and the like, may be freely available to customers for Internet access.

A Carrier may use Voice over Internet Protocol (VoIP) which is a technology that provides voice communications services and data communications services (e.g., multimedia sessions) over Internet Protocol (IP) networks, such as the Internet and/or private packet networks. Typically, a software telephony application using VoIP which can be installed on various devices such as handheld devices with Android or iOS operating systems, and desktop or laptop computers with Windows or Linux operating systems, for example. Further, VoIP technologies have evolved to include a telephone number for users and which include Short Message Service (SMS) for text messaging services.

These software telephony applications may be installed on mobile devices as well as fixed (hard-wired desktop) computers. A single user may have a number of fixed computers and mobile devices where the software telephony application is installed. It may be convenient for the user if the devices of the user all have the same telephone number.

A new user of a software telephony application may select a telephone number from a list of telephone numbers. Typically, the list of telephone numbers presented to new users would be from a larger pool of available telephone numbers. The list is typically a random selection of telephone numbers from the pool. It would be advantageous to improve the random selection of telephone numbers from the pool in order to provide desirous telephone numbers to new users for selection.

SUMMARY

According to one aspect of the present invention, there is provided a communications system comprising: a mobile network to provide communications for a plurality of mobile communications devices over a wide-area IP network, wherein each of the plurality of mobile communications devices is associated with a respective mobile directory numbers are associated with the plurality of mobile communications devices; a wireless local-area network (WLAN) to provide communications for a plurality of communications devices over the wide-area IP network; a voice over internet protocol (VoIP) service coupled to the mobile network and the WLAN via the wide-area IP network, wherein the plurality of communications devices are associated with VoIP telephone numbers; a public switched telephone network (PSTN) coupled to the VoIP service; and a communications routing system coupled to the plurality of communications devices and coupled to the VoIP service; and wherein at least one VoIP telephone number is selected from a subset of telephone numbers, wherein the subset is filtered from a global telephone number pool based on a mnemonic seed, wherein each alphanumeric representation of respective telephone numbers in the subset is within a threshold Hamming distance of the mnemonic seed.

According to a further aspect, there is provided a communications system wherein the subset comprises a set of telephone numbers from the global telephone number pool with the smallest Hamming distance from the mnemonic seed.

According to a further aspect, there is provided a communications system wherein the mnemonic seed comprises a functional mnemonic phrase.

According to a further aspect, there is provided a communications system wherein the mnemonic seed comprises a selection of characters from a functional mnemonic phrase.

According to a further aspect, there is provided a communications system wherein the mnemonic seed comprises a homophonic combination of a functional mnemonic phrase.

According to a further aspect, there is provided a communications system wherein the mnemonic seed comprises one or more of: a user's first name, a user's last name, a user's account username, a user's date of birth, a user's ZIP code, and a user's latitude and longitude pair.

According to a further aspect, there is provided a communications system wherein the subset is further filtered based on location information for a mobile communications device associated with a user, wherein the telephone numbers have an area code for a geographic region determined based on the location information.

According to a further aspect, there is provided a communications system wherein the mnemonic seed associated with a telephone number is displayed with the telephone number for selection by a user.

According to one aspect of the present invention, there is provided a method including: obtaining a mnemonic seed; obtaining a subset of telephone numbers filtered from a global telephone number pool based on the mnemonic seed, wherein each alphanumeric representation of respective telephone numbers in the subset is within a threshold Hamming distance of the mnemonic seed; receiving an indication of a selected telephone number from the subset; and assigning the selected telephone number to the user account.

According to a further aspect, there is provided a method wherein the subset comprises the telephone numbers from the global telephone number pool with the smallest Hamming distance from the mnemonic seed.

According to a further aspect, there is provided a method wherein the mnemonic seed comprises one or more of: a functional mnemonic phrase; a selection of characters from a functional mnemonic phrase; and a homophonic combination of a functional mnemonic phrase.

According to a further aspect, there is provided a method wherein the mnemonic seed comprises one or more of: a user's first name, a user's last name, a user's account name, a user's date of birth, a user's ZIP code, and a user's latitude and longitude pair.

According to a further aspect, there is provided a method further comprising obtaining an area code, and wherein the subset is further filtered based on the area code.

According to a further aspect, there is provided a method wherein obtaining the area code comprises obtaining location information for a communications device associated with the user account; and determining the area code for a geographic region associated with the location information.

According to a further aspect, there is provided a method wherein obtaining the area code comprises prompting a user to enter the area code.

According to a further aspect, there is provided a method further comprising reserving, in the global telephone number pool, the telephone numbers in the subset.

According to a further aspect, there is provided a method further comprising responsive to reserving the telephone numbers in the subset, tracking a predetermined period of time.

According to a further aspect, there is provided a method further comprising: if the indication of the selected telephone number is prior to the predetermined period of time elapsing: assigning the selected telephone number to the user account; and releasing other telephone numbers in the subset back to the global telephone number pool; and if the selected telephone number is not received prior to the predetermined period of time elapsing: expiring the predetermined period of time; and releasing all the telephone numbers in the subset back to the global telephone number pool.

According to a further aspect, there is provided a method further comprising displaying the subset of telephone numbers at a communications device with the respective mnemonic seeds used to generate the telephone numbers.

According to one aspect of the present invention, there is provided a server for assigning a telephone number to a user account in a communications system, the server comprising a memory; a communications interface; a processor interconnected with the memory and the communications interface, the processor configured to: obtain a subset of telephone numbers filtered from a global telephone number pool based on the mnemonic seed, wherein each alphanumeric representation of respective telephone numbers in the subset is within a threshold Hamming distance of the mnemonic seed; receive an indication of a selected telephone number from the subset; and assign the selected telephone number to the user account.

BRIEF DESCRIPTION OF THE DRAWINGS

The drawings illustrate, by way of example only, implementations of the present invention.

DETAILED DESCRIPTION

The present invention generally relates to providing wireless carrier services (e.g., voice calls, short message service or SMS messages, general data communications, etc.) with quality of service to VoIP telephone numbers where each VoIP telephone number is associated with one or more communications devices. While certain infrastructure may not operate under Internet Protocol (IP) (e.g., PSTNs, cellular base station networks, etc.), communications are routed to and from such infrastructure using IP to the extent possible. The present invention also generally relates to providing communications with QoS between communication devices operating under the same account (same VoIP telephone numbers), and tracking and managing prepaid balances for traditional carrier services (e.g., voice call minutes, SMS messages, etc.) that are routed, an may be delivered, over IP. Other aspects of the present invention will also become apparent in light of the following detailed description.

Figure 1:
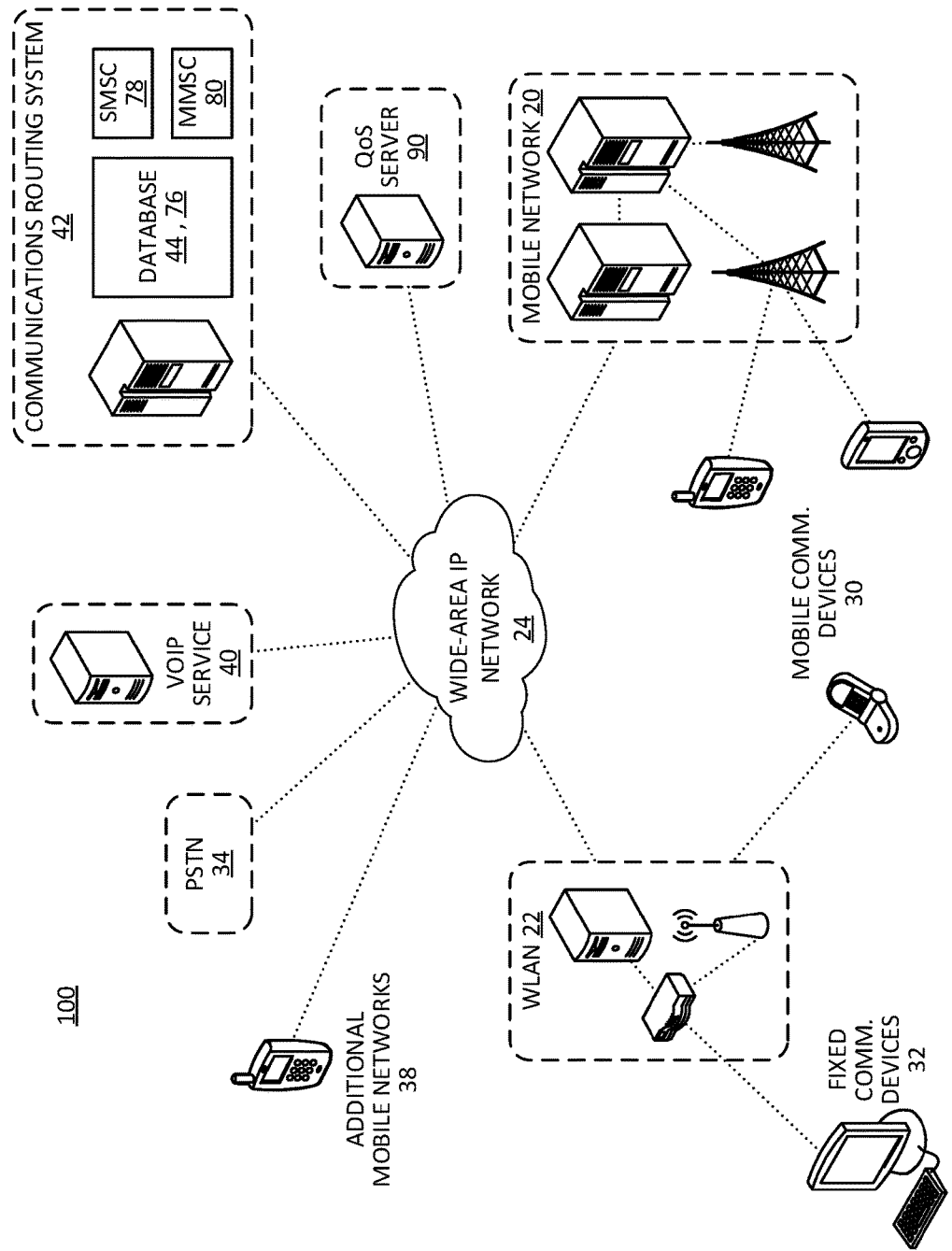
FIG. 1 is a block diagram of an example environment of a communications system which provides a list of telephone numbers for selection by new users.

FIG. 1 shows a block diagram of an example environment of a communications system 100 which provides a list of telephone numbers for selection by new users.

The system 100 includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides voice, data, and SMS services.

The system 100 further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) or the similar entity (not shown). The mobile network 20 can be connected to the wide-area IP network 24 by a packet data interface.

The system 100 can further include a push notification service, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

One or more stationary (fixed) communications devices 32, such as a desktop computer, laptop or wi-fi only device, server, or similar, can also connect to the WLAN 22, via a router or wired access point. For clarity, the term communications devices 30, 32 means mobile communications devices 30 and fixed communications devices 32.

The system 100 can further be connected to a public switched telephone networks (PSTN) 34 that supports connecting to a plurality of landline telephones, and additional mobile networks 38. The additional mobile networks 38 may have the same or similar features of the mobile network 20 and may be operated by different carriers and/or operated according to different technologies and standards when compared to the mobile network 20. For clarity, the mobile communications devices 30 connected to the mobile network 20 may also initiate to or receive voice calls directly from the PSTN 34 (which may include additional mobile networks 38) via the mobile network 20. Further, such voice calls, for example, may be via GSM (Global System for Mobile communication) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The system 100 further includes at least one voice-over-IP (VoIP) service 40, which can be configured to manage IP data streams related to VoIP communications (for example routing the IP data steam from communications device 30, 32 to another communications device 30, 32). All VoIP calls are steamed through the VoIP service 40. It also interfaces (transcoding as necessary) with the PSTN 34 and the additional mobile networks 38.

The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines and wireless devices in the additional mobile networks 38. One of the functions of the VoIP service 40 is to transcode the IP data streams so that it is compatible between different networks (for example between the mobile network 20 and the PSTN 34). In some implementations, the VoIP service 40 is a subcomponent of the mobile network 20 or the additional mobile networks 38.

The system 100 further includes a communications routing system 42 connected to the VoIP service 40, the push notification service (not shown for simplicity), and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines) of the PSTN 34 and the additional mobile networks 38 as needed.

The system 100 can further include a proxy connected to the communications routing system 42, the WLAN 22, and the mobile network 20 via the wide-area IP network 24. In some implementations, the communications routing system 42 and the mobile communications devices 30 can be configured to route communications events through the proxy. The proxy can be configured to handle VoIP call handoffs, as an alternative to the communications routing system 42 handling such. In addition, the proxy can be configured to prioritize communications events associated with the enhanced 911 system, as an alternative to the communications routing system 42 doing so. For example, the proxy can control quality of service (QoS) settings for various communications, so that 911 calls are prioritized. In some implementations, the VoIP service 40 is configured to route all relevant VoIP data through the proxy. A suitable proxy service can be in the form of that available from Pravala Networks Inc., of Kitchener, Ontario, Canada.

The system 100 can further include an interoperation service connecting the communications routing system 42 to the mobile network 20 via the wide-area IP network 24. The communications routing system 42 can be connected to the interoperation service via a virtual private network (VPN) established over the wide-area IP network 24. The interoperation service is configured to interface with the various mobile networks 20, 38. The interoperation service facilitates data communications between the communications routing system 42 and the mobile network 20. The interoperation service further facilitates messaging services, such as SMS and MMS, between the communications routing system 42 and the additional mobile networks 38. The interoperation service can be the kind provided by Syniverse of Tampa, Fla.

The communications routing system 42 (FIG. 2) includes at least one database, such as an accounts database 44 and one or more user data databases 76, configured to store a plurality of associations between unique account identifiers (e.g., user names) and device identifiers including mobile-network identifiers supported by the mobile network 20, such as mobile directory numbers (MDNs, or telephone numbers) of the mobile communications devices 30, and fixed identifiers of the fixed communications devices 32. For each user name, the database 44, 76 can store associations with a number of communications devices 30, 32. A user may have one or more fixed communications devices 32 and/or one or more mobile communications devices 30. For some embodiments, a mobile device, such as a laptop or tablet, with only WLAN 22 capabilities can be treated as fixed communications devices 32.

One mobile communications device 30 can have a first MDN for SMS/MMS messages and VoIP calls, and a second MDN for services on the mobile network 20. The first and second MDNs are district and mutually different. The first MDN is used at the VoIP service 40 and the communications routing system 42 for VoIP calls. The first MDN is also used at the interoperation service and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service, so that the communications routing system 42 can send push notifications to the mobile communications devices 30. Alternatively or additionally, the database 44, 76 may store currently assigned IP addresses for the communications devices 30, 32.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

In other embodiments, a VoIP telephone number is associated with each user name which is distinct from the MDNs of the one or more mobile communication devices 30 of the user. The IP addresses of the communications devices 30, 32 may be obtained when the communications devices 30, 32 contacts the communications routing system 42.

The communications routing system 42 further includes a routing engine responsive to incoming communications events. Incoming communications events can include initiation of voice calls, ending of voice calls, communication of SMS/MMS messages, requests for data. The routing engine is further configured to route data communications with the plurality of mobile communications devices 30 over the mobile network 20 and the WLAN 22 using the Internet, as well as with the plurality of fixed communications devices 32 over the WLAN 22 using the Internet. The routing engine is further configured to initiate and end voice calls with communications devices 30, 32 as VoIP calls using the VoIP service 40, and to communicate SMS messages with the plurality of mobile communications devices 30 via the mobile network 20 and the WLAN 22 using the Internet, as well as with the plurality of fixed communications devices 32 over the WLAN 22 using the Internet.

The communications routing system 42 can further include a short message service center (SMSC) 78 and a multimedia message service center (MMSC) 80 configured to store, forward, convert and deliver SMS and MMS messages between the communications routing system 42 and the interoperation service. The SMSC 78 and MMSC 80 can be configured to communicate with the interoperation service using the Short Message Peer-to-Peer (SMPP) protocol.

Each mobile communications device 30 and fixed communications device 32 can be associated with one of the unique account identifiers (e.g., user names) stored in the database 44, 76. This can be achieved by, for example, a client program executed on the mobile communications device 30 requiring a user log in. When a user is logged in to the client program, for example, the mobile communications device 30 becomes associated with the respective unique account identifier.

For each account identifier in the database 44, 76; there is associated a voice call log, voice mails, SMS/MMS messages, contacts, and other such account data. Such account data must be synchronized with the communications devices 30, 32 of each account identifier so that a user may review the same account data between different communications devices 30, 32 of the user.

Each account identifier can be associated with a plurality of mobile communications devices 30, and each of the mobile communications devices 30 can be associated with a first mobile-network identifier, such as a first MDN that is associated with the VoIP service 40. Each account identifier can be associated with a second mobile-network identifier, such as a second MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account identifier, voice services via the VoIP service 40 are conducted with one MDN and data services are conducted via the mobile network using a different MDN. The communications routing system 42 maps each MDN to a particular account for managing overall services to that account identifier.

An outgoing voice call from a communications device 30, 32 is conducted as follows. The communications device 30, 32 sends a call request to the VoIP service 40 via the WLAN 22, if connected, or otherwise via the mobile network 20. The communications device 30, 32 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device (if connected via mobile network 20, through the push notification service) to notify the destination device of the call. Then the destination device registers with the VoIP service 40, if not already registered, and notifies the VoIP service 40 of call acceptance. The VoIP service 40 can notify the communications routing system 42 of call initiation and ending. When the proxy is used, VoIP voice data is routed through the proxy. The outgoing voice call event is recorded in the associated account data of the account identifier in the communications routing system 42 so that it may be synchronized with the client programs on the other communications devices 30, 32 of the account identifier.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

For some embodiments, incoming voice calls to a VoIP telephone number of the communications devices 30, 32 arrive at the VoIP service 40 via the PSTN 34 (for example). Incoming voice calls may also arrive at the VoIP service 40 via the mobile network 20 or the WLAN 22. The VoIP service 40 notifies the communications routing system 42 of a call request for a particular destination communications device 30, 32. The communications routing system 42 then issues a push notification to all of the destination communications devices 30, 32 (through the push notification service, where connected to the mobile network 20), associated with the VoIP telephone numbers, to notify the destination communications devices 30, 32 of the call.

If the user of the destination communications devices 30, 32 accepts the call on one of the destination communication devices 30, 32, then the destination communications device 30, 32 registers with the VoIP service 40, if not already registered, and notifies the VoIP service 40 of call acceptance. The VoIP service 40 notifies the communications routing system 42 of call initiation and ending.

Incoming and outgoing voice calls made to or from a communications device 30, 32 associated with the communications routing system 42 are made using the VoIP telephone number, which is established at the VoIP service 40. When such a call is conducted as data via the mobile network 20, the second MDN of the relevant mobile communications device 30 is used to track the data usage on the mobile network 20.

In some embodiments, caller ID is based on the VoIP telephone number to the exclusion of the mobile network MDN. That is, the mobile network MDN is for tracking data usage only, and the VoIP telephone number is the basis for outgoing and incoming calls.

An outgoing SMS/MMS message can be sent by a communications device 30, 32 as follows. One or more IP data packets containing the SMS/MMS message are sent from the communications device 30, 32 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a communications device 30, 32 associated with the communications routing system 42. If the destination device is a communications device 30, 32 associated with the communications routing system 42, then the communications routing system 42 stores the message and sends a push notification to the destination communications device 30, 32 via the push notification service (if connected via the mobile network 20). When a user at the destination communications device 30, 32 opens an SMS/MMS application/module or performs a similar action, the destination communications device 30, 32 fetches the stored message from the communications routing system 42. If the destination device is not associated with the communications routing system 42, then the communications routing system 42 sends the SMS/MMS message to the destination device via the interoperation service.

Incoming SMS/MMS messages for the communications devices 30, 32 arrive at the communications routing system 42 either directly from other communications devices 30, 32 that have accounts at the communications routing system 42 or via the interoperation service for devices that are not associated with the communications routing system 42. The communications routing system 42 stores a particular SMS/MMS message and sends a push notification to the destination communications device 30, 32. When a user at the destination communications device 30, 32 opens an SMS/MMS application/module or performs a similar action, the destination communications device 30, 32 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Incoming and outgoing SMS/MMS messages are recorded in the associated account data of the account identifier in the communications routing system 42 so that it may be synchronized with the client programs on the other communications devices 30, 32 of the account identifier. In some embodiments, this synchronization occurs as and when the user of the other communication devices 30, 32 accesses the associated client programs when the client programs contacts the communications routing system 42 to synchronize with the incoming and outgoing SMS/MMS messages, the voice call logs, the voice mails, and other such services including an address book of contacts.

Data communications between communications devices 30, 32 and between communications devices 30, 32 and data sources, such as web sites connected to the wide-area IP network 24, are performed via the WLAN 22, if connected, and otherwise via the mobile network 20.

The system 100 further comprises a quality of services (QoS) server 90. The QoS server 90 determines the performance of a data channel to a communications device 30, 32 for a voice call. Where the performance of the data channel to a communications device 30, 32 degrades or drops, the QoS server 90 directs the communication routing system 42 to establish a new channel to the communications device 30, 32 to continue the voice call. In the event that all data channels are degraded or terminated, then the QoS server 90 directs the communications routing system 42 to continue the voice call via a voice channel over the PSTN 34 (or mobile network 20) when the mobile communications device 30 is connected to the mobile network 20.

The QoS server 90 is shown as a standalone component in FIG. 1, however, it may be a subcomponent of another component such as the VoIP Service 40 and the communications routing system 42. The QoS server 90 is connected to the wide-area IP network 24 and as such a connection can be made with any of the communications devices 30, 32.

For further clarity, it will be understood that the mobile communications devices 30 may be simultaneously connected to both the mobile network 20 and the WLAN 22. While mobile network 20 may generally provide a better performing data channel then the WLAN 22 for voice calls, the WLAN 22 may provide the data channel free of charge to users.

Figure 2:
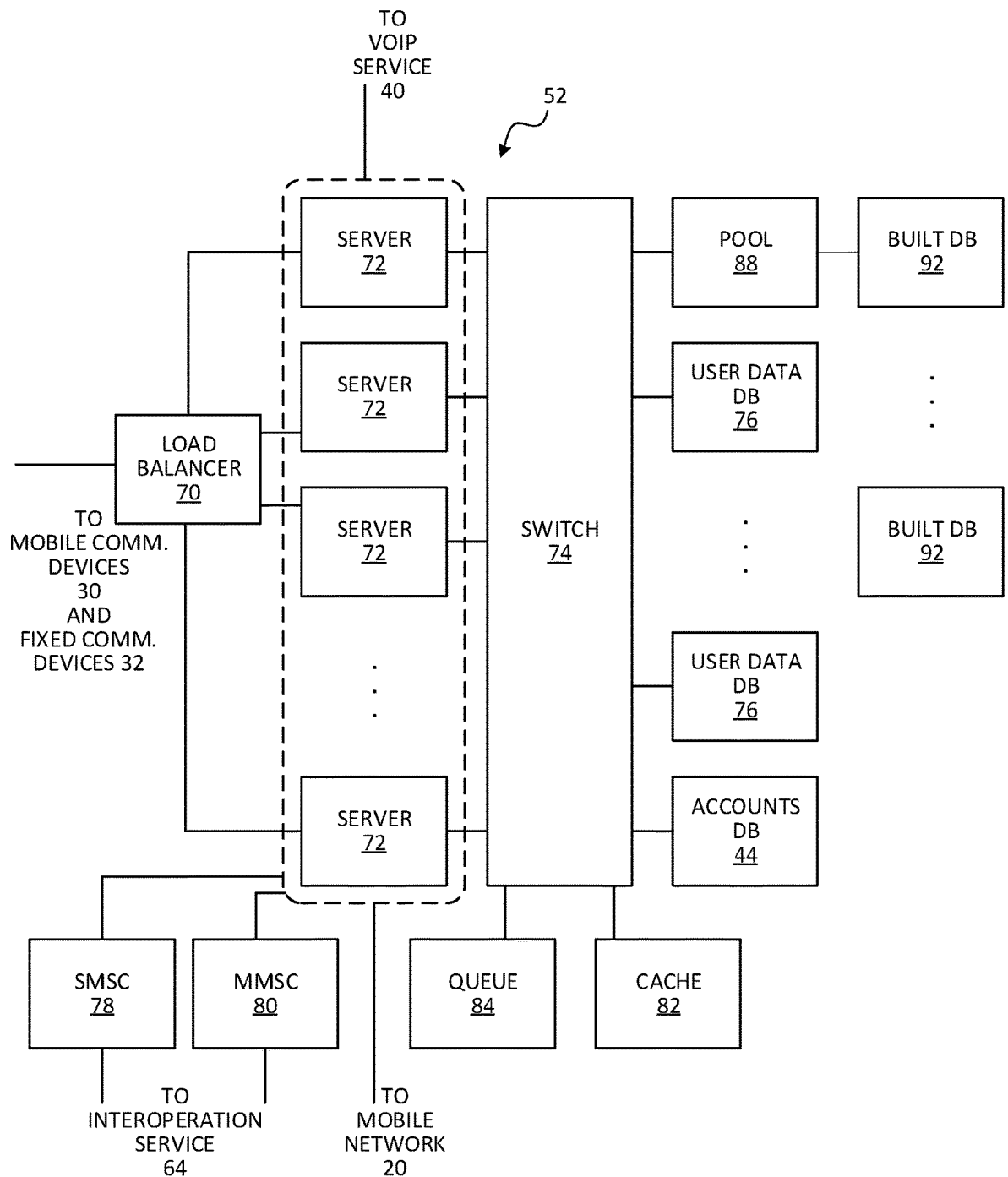
FIG. 2 is a block diagram of a communications routing system.

FIG. 2 shows a diagram of the communications routing system 42. The communications routing system 42 includes a global telephone number pool 88 (also referred to herein as simply pool 88) which includes built databases (DB) 92, a load balancer 70, a plurality of servers 72, a switch 74, a plurality of user data databases 76, and the accounts database 44. The load balancer 70, servers 72, and switch 74 can be considered a routing engine. However, this is not limiting.

Communications devices 30, 32 connect to the load balancer 70 via the wide-area IP network 24 using a protocol, such as HTTP, HTTPS, or the like. The load balancer 70 is configured to balance requests from the communications devices 30, 32 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 may contain program code (e.g. stored in memory) configured to perform the functionality described herein. The servers 72 may interface with APIs and other computing devices via communications interfaces. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service using, for example, the SMPP protocol and the MM4 protocol. The SMSC 78 and MMSC 80 can be configured to connect to the interoperation service via a suitable binding and through a VPN tunnel. The SMSC 78 and MMSC 80 expose an API to the routing engine, such that the routing engine can use the API to send outgoing SMS/MMS messages. For incoming messages, the SMSC 78 and MMSC 80 are configured to invoke an API of the routing engine to cause the routing engine to store a received message and send a notification of the message to the destination communications device 30, 32.

The switch 74 connects the servers 72 to the user data databases 76, the accounts database 44, a cache 82, a queue 84, and the pool 88 which includes built databases (DB) 92.

The user data databases 76 store data for each of the users identified in the accounts database 44. Such user data can include the mobile network MDNs, session ID, password, residential address, contacts (i.e. address book of contacts), sessions, in-app purchases, subscriptions, settings, balance information, and communications events including call histories, voice mail content, SMS/MMS message transmission histories, and SMS/MMS message content. The user data databases 76 can be configured to store communications event histories for all user names in the accounts database 44, such that a particular user's history can be downloaded to any communications device 30, 32 with which the user logs in. The user data databases 76 can be implemented as database shards.

The user data is stored by the communications routing system 42 so that it may be synchronized with the client programs on the communications devices 30, 32 of the account identifiers (i.e. user accounts). In some embodiments, this user data synchronization occurs as and when the user accesses the client programs on the of the communication devices 30, 32 of the user.

In addition, for some embodiments, the routing engine is configured to answer incoming calls with a busy signal when one of the communications devices 30, 32 of associated with the VoIP telephone number is in another call. In other embodiments, the routing engine is configured to instead ring (notification including by audio and/or vibration) the communications devices 30, 32 with the communications device 30, 32 is in the another call providing an indication (by audio or vibration).

The cache 82 can be checked for data prior to requesting data from the user data databases 76. In addition, requests can be queued in the queue 84, which can be implemented using Redis or similar technology.

The accounts database 44 stores accounting data (such as data usage) of the users (or user accounts) and may include the identity of the users, account identifiers (user names), and associated VoIP telephone numbers.

The pool 88 is a database which stores telephone numbers which are available for assignment to user accounts. When a user or user account desires a new telephone number, the user may select a telephone number from the pool 88 as their associated telephone number. Alternatively, the user may be assigned a telephone number from the pool 88.

The pool 88 further comprises one or more built databases 92. The built databases 92 being databases of potentially more personalized telephone numbers associated with identifying criteria. An example identifying criteria is geographic location of users which can be mapped to available telephone numbers such as 1-416-355-PEEL for a user in the town of Peel. Another example identify criteria are parts or whole ZIP codes such as 32828 zip code associated with the telephone number 1-407-553-2828 or 1-407-328-2855.

An example built database 92 are telephone numbers based on user names which can be mapped to alphanumeric digits based on the letters associated with the telephone keypad such as 1-800-444-ERIC. A further example are keywords relevant to what the number is intended to be used for, such as 1-800-PAINTER.

Figure 3:
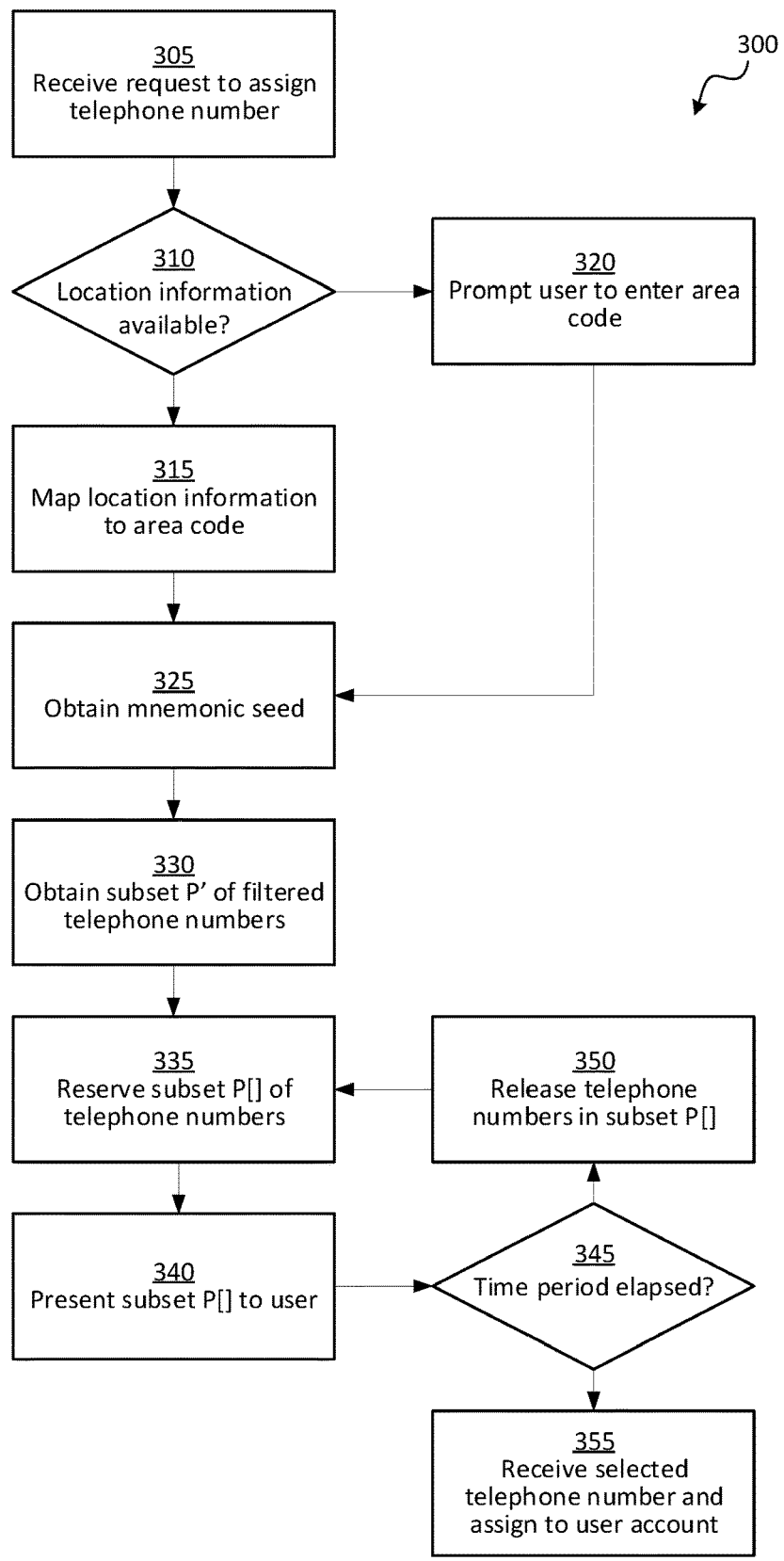
FIG. 3 is a flow diagram of a method to assign telephone numbers to a user account.

FIG. 3 shows a flow diagram of a method 300 to assign telephone numbers to a user account. The method 300 will be described in conjunction with the system 100 and the components illustrated in FIGS. 1 and 2. For example, the method 300 may be performed by the communications routing system 42, and in particular, by one of the servers 72 of the communications routing system 42. In other examples, the method 300 may be performed by other suitable systems.

At block 305, the communications routing system 42 receives a request to assign a telephone number to a user account. For example, the request may be initiated when a new user account is being set up and the user account is in a state without a telephone number. In other examples, the request may be initiated when a user having an existing user account wishes to change the telephone number associated with the account. Specifically, the request may be received from a user's communications device 30, 32, and in particular, from a user application (e.g. executable in a browser or locally on the user's communications device 30, 32) for managing user accounts.

At block 310, after receiving the request, the communications routing system 42 determines whether or not location information is available for the user. For example, the communications routing system 42 may request location information from the user's communications device 30, 32 in response to receiving the request to assign a new telephone number at block 305. In an embodiment, the location information may be a latitude and longitude coordinate pair available to the user application on the user's communications device 30, 32. If the location information is available, the location information is sent to the communications routing system 42, and the method proceeds to block 315.

At block 315, the communications routing system 42 maps the location information to a local area code. For example, the communications routing system 42 may map the latitude and longitude coordinate pair an area code based on the closest geographic region to the latitude and longitude coordinate pair. The mapping may use the built database 92 which includes a mapping of latitude and longitude coordinate pairs to telephone number area codes. In other examples, the built database 92 may include a first mapping of latitude and longitude coordinate pairs to ZIP codes, or other suitable geographic region identifiers, and a second mapping of the resulting ZIP code or other geographic region identifier to local telephone number area codes. The local telephone number area codes applicable to the user account is thus determined. In some examples, one or more local telephone number area codes may be applicable to a user account. For example, some geographic regions of local telephone number area codes may overlap. Further, some geographic regions may include multiple local telephone number area codes or multiple local overflow area codes. The resulting one or more local area codes are stored as a variable x1 at the communications routing system 42.

If, at block 310, location information is not available on the user's account, or on the user's communication device 30, 32, the method proceeds to block 320. At block 320, the communications routing system 42 transmits a prompt to enter one or more local area telephone number codes. The prompt may be displayed, for example, at the user's communication device 30, 32 from which the request was received at block 305. Upon receipt of the one or more local area telephone number codes from the user, the one or more local telephone number area codes are stored as a variable x1 at the communications routing system 42.

At block 325, the communications routing system 42 obtains a mnemonic seed for storing in a second variable x2. In some examples, the variable x2 may store more than one mnemonic seed. For example, the communications routing system 42 may cooperate with the user application to obtain a mnemonic seed based on user information associated with the user's account. For example, the mnemonic seed may be based on one or more of: the user's first name, the user's last name, the user's account name, the user's date of birth, the user's ZIP code, and the user's latitude and longitude pair (or other location information). In other embodiments, the communications routing system 42 may obtain the user information independently from the user application, based on data stored at the communications routing system 42. The user information may be provided during account registration (not shown). For example, a user with the name Jeff may desire a telephone number which is has an alphanumeric representation of "JEFF", such as 212-555-5333.

At block 330, the communications routing system 42 obtains a subset P' of telephone numbers filtered from the global telephone number pool 88 based on the variables x1 and x2. Specifically, the communications routing system 42 filters for a list of options for suggested telephone numbers. For example, the filtering may be performed as follows: for x1, the communications routing system 42 filters the telephone numbers in the pool 88 to provide the subset P' that is in the area code or in the local overflow area codes; x2 is used amongst the set P' to find telephone number options that have a threshold Hamming distance between the alphanumeric representation of the telephone number and one or more of the mnemonic seeds stored in the variable x2. P' may then be modified to be an ordered set using the calculated Hamming distance in ascending order.

A Hamming distance is the calculated distance (relevance) between two strings based on the differences in the characters in the string. As an example, the strings "BAT" and "BAG" have a Hamming distance of one ("T" and "G" are the only different characters). The calculation for the Hamming distance is well known and is also described at en.wikipedia.org/wiki/Hamming_distance.

At block 335, the communications routing system 42 obtains a subset P[ ] of the telephone numbers in the subset P' and reserves the numbers in the subset P[ ] in the global telephone number pool 88. In some examples, the subset P[ ] may include five telephone numbers from the ordered set P' which are not yet reserved in the global telephone number pool 88, and which have the lowest Hamming distance based on at least one mnemonic seed stored in the variable x2. For example, the communications routing system 42 may evaluate each telephone number in the ordered set P' starting at the beginning. In particular, for each telephone number, the communications routing system 42 may first check whether the telephone number is still available in the global telephone number pool 88. If the telephone number is available, the communications routing system 42 may add the telephone number to the subset P[ ] and reserve the telephone number in the global telephone number pool 88. If the telephone number is not available, the communications routing system 42 may proceed to the next telephone number in the ordered subset. The communications routing system 42 may continue in this manner until a threshold condition is reached. For example, the threshold condition may be the subset P[ ] having five telephone numbers, or the subset P' being exhausted.

At block 340, the subset P[ ] is presented to a user for selection and a timer is initiated. Specifically, the timer tracks a predetermined maximum period of time in which the telephone numbers in the subset P[ ] are to be reserved. That is, the timer tracks the predetermined period of time during which the user may select a telephone number from the subset P[ ] while the telephone numbers are reserved. The subset P[ ] may be presented to the user, for example, via the user application at the user's communication device 30, 32. In some examples, the telephone numbers in the subset may be displayed with the mnemonic seed used to generate the telephone number.

At block 345, the communications routing system 42 determines whether the predetermined period of time has elapsed. If the time has elapsed, the method proceeds to block 350.

At block 350, the communications routing system 42 expires the predetermined period of time and releases the telephone numbers in the subset P[ ] back to the global telephone number pool 88. In some examples, the communications routing system 42 may then return to block 335 to obtain a new subset P[ ] based on the variables x1 and x2. In particular, subsequent iterations of block 335 may generate different subsets P[ ] due to the nature of the global telephone number pool 88. The pool 88 is accessible for multiple user accounts, but a single telephone number may only be available to a single user account at a time. Thus, the telephone number may be reserved for another user account, and hence it may not be an option in subsequent iterations of the block 335.

If, at block 345, the predetermined period of time has not elapsed, the communications routing system 42 continues to maintain the subset P[ ] and the presentation of the subset P[ ] to the user.

At block 355, the communications routing system 42 receives a selection of a telephone number from the user. Specifically, the selection may be received at the user application, and communicated via the user application to the communications routing system 42. The communications routing system 42 may then assign the selected telephone number to the user account.

Figure 4:
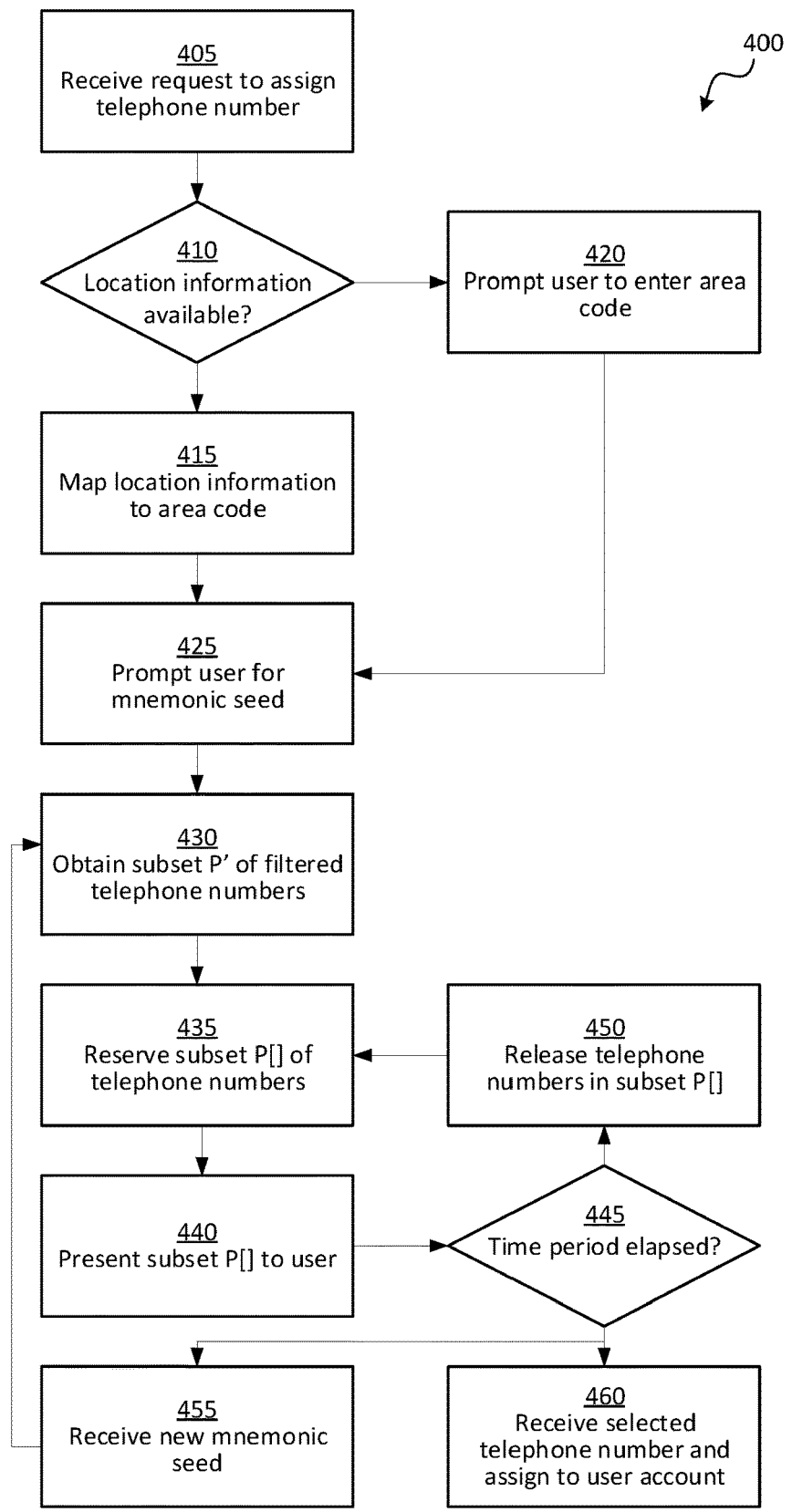
FIG. 4 is a flow diagram of another method to assign telephone numbers to a user account.

FIG. 4 shows a flow diagram of another method 400 to assign telephone numbers to a user account.

At block 405, the communications routing system 42 receives a request to assign a telephone number to a user account. For example, the request may be initiated when a new user account is being set up and the user account is in a state without a telephone number. In other examples, the request may be initiated when a user having an existing user account wishes to change the telephone number associated with the account. Specifically, the request may be received from a user's communications device 30, 32, and in particular, from a user application (e.g. executable in a browser or locally on the user's communications device 30, 32) for managing user accounts.

At block 410, responsive to receiving the request, the communications routing system 42 determines whether or not location information is available for the user. For example, the communications routing system 42 may request location information from the user's communications device 30, 32 in response to receiving the request to assign a new telephone number at block 405. In an embodiment, the location information may be a latitude and longitude coordinate pair available to the user application on the user's communications device 30, 32. If the location information is available, the location information is sent to the communications routing system 42, and the method proceeds to block 415.

At block 415, the communications routing system 42 maps the location information to a local area code. For example, the communications routing system 42 may map the latitude and longitude coordinate pair an area code based on the closest geographic region to the latitude and longitude coordinate pair. The mapping may use the built database 92 which includes a mapping of latitude and longitude coordinate pairs to telephone number area codes. In other examples, the built database 92 may include a first mapping of latitude and longitude coordinate pairs to ZIP codes, or other suitable geographic region identifiers, and a second mapping of the resulting ZIP code or other geographic region identifier to local telephone number area codes. The local telephone number area codes applicable to the user account is thus determined. In some examples, one or more local telephone number area codes may be applicable to a user account. For example, some geographic regions of local telephone number area codes may overlap. Further, some geographic regions may include multiple local telephone number area codes or multiple local overflow area codes. The resulting one or more local area codes are stored as a variable x1 at the communications routing system 42.

If, at block 410, location information is not available on the user's account, or on the user's communication device 30, 32, the method proceeds to block 420. At block 420, the communications routing system 42 transmits a prompt to enter one or more local area telephone number codes. The prompt may be displayed, for example, at the user's communication device 30, 32 from which the request was received at block 405. Upon receipt of the one or more local area telephone number codes from the user, the one or more local telephone number area codes are stored as a variable x1 at the communications routing system 42.

At block 425, the communications routing system 42 prompts the user to supply a mnemonic seed for storing as a second variable x2. For example, a prompt may be displayed at the user's communications device 30, 32 via the user application. The user may input a desired keyword or phrase as the mnemonic seed. Examples of mnemonic seeds include any words that a user may want to have include as part of an alphanumeric representation of their telephone number, such as 212-555-TECH. Another example of a mnemonic seed is a number, such as the number 1234, resulting in the telephone number 212-555-1234. Other examples of suitable mnemonic seeds include the user's first name, the user's last name, the user's account name, the user's date of birth, the user's ZIP code, the user's latitude and longitude pair, and other functional phrases (such as PAINTER, PIZZA, CAKE, PHONE, CAR, etc.) and other phrases.

In some examples, the functional mnemonic phrase may exceed the number of digits of a standard telephone number (e.g. exceeding 7 or 10 characters). The communications routing system 42 may be configured to select a selection of characters, including acronyms of the phrase, rather than the full phrase, for storing as a mnemonic seed in the variable x2. For example, the communications routing system 42 may include a database of common acronyms or character selections for commonly used words. The phrase "LUCKY SUPERJACKOT" may result in the alphanumeric representation 212-555-LYSJ or 212-LUC-JACK or 212-555-LUSK. Further, in addition to using common terms, a homophonic relationship of letters and numbers or phrases and letters may be used to increase the number of possible telephone numbers that can be mapped to the mnemonic seed input by the user. For example, the substring "ATE" may be substituted with the number 8, as the pronunciation of "ATE" and "eight" are similar. If a user were to enter a phrase such as "GATE", the communications routing system 42 may return telephone numbers containing the digits 4283, having an alphanumeric representation G-A-T-E, or the digits 48, having the alphanumeric representation G-8. Hence both "GATE" or "G8" may be stored as a mnemonic seed in the variable x2. This may be repeated with multiple homophonic combinations that exist in any phonetic language.

At block 430, the communications routing system 42 obtains a subset P' of telephone numbers filtered from the global telephone number pool 88 based on the variables x1 and x2. Specifically, the communications routing system 42 filters for a list of options for suggested telephone numbers. For example, the filtering may be performed as follows: for x1, the communications routing system 42 filters the telephone numbers in the pool 88 to provide the subset P' that is in the area code or in the local overflow area codes; x2 is used amongst the set P' to find telephone number options that have a threshold Hamming distance between the alphanumeric representation of the telephone number and one or more of the mnemonic seed stored in the variable x2. P' may then be modified to be an ordered set using the calculated Hamming distance in ascending order.

At block 435, the communications routing system 42 obtains a subset P[ ] of the telephone numbers in the subset P' and reserves the numbers in the subset P[ ] in the global telephone number pool 88. In some examples, the subset P[ ] may include five telephone numbers from the ordered set P' which are not yet reserved in the global telephone number pool 88, and which have the lowest Hamming distance based on at least one mnemonic seed stored in the variable x2. For example, the communications routing system 42 may evaluate each telephone number in the ordered set P' starting at the beginning. In particular, for each telephone number, the communications routing system 42 may first check whether the telephone number is still available in the global telephone number pool 88. If the telephone number is available, the communications routing system 42 may add the telephone number to the subset P[ ] and reserve the telephone number in the global telephone number pool 88. If the telephone number is not available, the communications routing system 42 may proceed to the next telephone number in the ordered subset. The communications routing system 42 may continue in this manner until a threshold condition is reached. For example, the threshold condition may be the subset P[ ] having five telephone numbers, or the subset P' being exhausted.

At block 440, the subset P[ ] is presented to a user for selection and a timer is initiated. Specifically, the timer represents a predetermined maximum period of time in which the user may select a telephone number from the subset P[ ]. The subset P[ ] may be presented to the user, for example, via the user application at the user's communication device 30, 32. In some examples, the telephone numbers in the subset may be displayed with the mnemonic seed associated with the telephone number.

At block 445, the communications routing system 42 determines whether the predetermined period of time has elapsed. If the time has elapsed, the method proceeds to block 450.

At block 450, the communications routing system 42 expires the predetermined period of time and releases the telephone numbers in the subset P[ ] back to the global telephone number pool 88. In some examples, the communications routing system 42 may then return to block 435 to obtain a new subset P[ ] based on the variables x1 and x2. In particular, subsequent iterations of block 435 may generate different subsets P[ ] due to the nature of the global telephone number pool 88. The pool 88 is accessible for multiple user accounts, but a single telephone number may only be available to a single user account at a time. Thus, the telephone number may be reserved for another user account, and hence it may not be an option in subsequent iterations of the block 335.

If, at block 445, the predetermined period of time has not elapsed, the communications routing system 42 continues to maintain the subset P[ ] and the presentation of the subset P[ ] to the user.

At block 455, the communications routing system 42 may receive a new word, phrase or number (or a combination thereof) to be entered as a new mnemonic seed for storing in the variable x2. Accordingly, the method returns to block 430 to obtain a new subset P' based on the previously stored x1 and the updated variable x2.

At block 460, the communications routing system 42 receives a selection of a telephone number from the user. Specifically, the selection may be received at the user application, and communicated via the user application to the communications routing system 42. The communications routing system 42 may then assign the selected telephone number to the user account.

Figure 5:
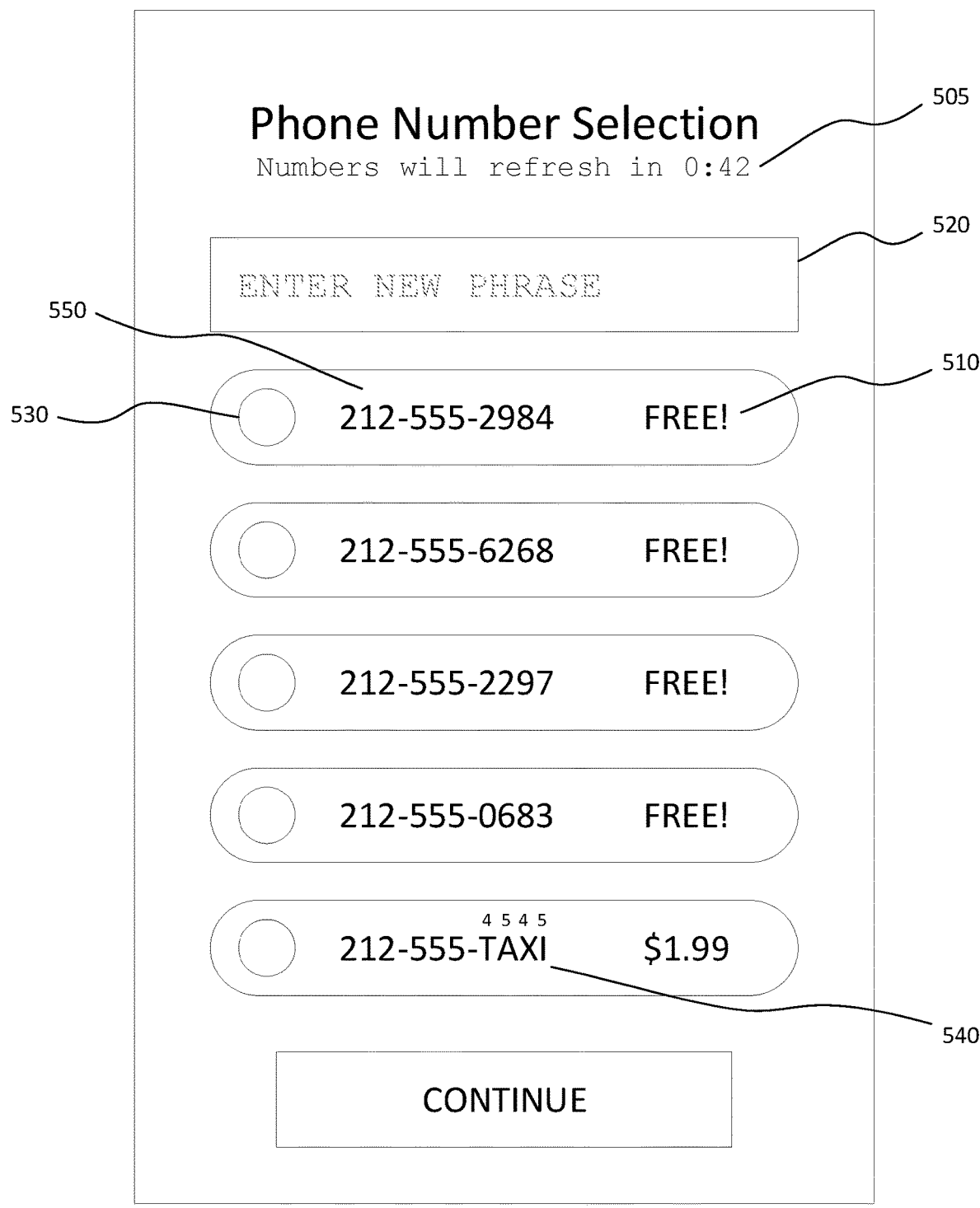
FIG. 5 is a screen of a communication device to display telephone numbers for user selection

FIG. 5 shows a screen of a communication device to display telephone numbers for user selection according to FIG. 4. The screen comprises a timer field 505, telephone number fields 550, pricing fields 510, selection fields 530, and a new search field 520. Further, in this example, the alphanumeric representation of the telephone number, including the mnemonic phrase 540, is displayed, with the associated digits of the telephone number displayed below for ease of association by the user. While FIG. 5 shows the alphanumeric representation 519-555-TAXI with the digits 4545 above the characters "TAXI", alternately, the digits 4545 may be displayed below the characters "TAXI". Optionally, the communication device may display the telephone number 519-555-4545, with the mnemonic seed "TAXI" displayed above or below the digits 4545. In some examples, respective mnemonic seeds used to generate each telephone number in the subset may be displayed with the telephone numbers.

While the foregoing provides certain non-limiting example implementations, it should be understood that combinations, subsets, and variations of the foregoing are contemplated. The monopoly sought is defined by the claims.

What is claimed is:

1. A communications system comprising:
a mobile network to provide communications for a plurality of mobile communications devices over a wide-area IP network, wherein each of the plurality of mobile communications devices is associated with a respective mobile directory numbers are associated with the plurality of mobile communications devices;
a wireless local-area network (WLAN) to provide communications for a plurality of communications devices over the wide-area IP network;
a voice over internet protocol (VoIP) service coupled to the mobile network and the WLAN via the wide-area IP network, wherein the plurality of communications devices are associated with VoIP telephone numbers;
a public switched telephone network (PSTN) coupled to the VoIP service; and
a communications routing system coupled to the plurality of communications devices and coupled to the VoIP service; and
wherein at least one VoIP telephone number for a user account is selected from a subset of telephone numbers, wherein each alphanumeric representation of respective telephone numbers in the subset is within a threshold Hamming distance of a seed obtained from a user account variable.

2. The system of claim 1, wherein the subset is filtered from a global telephone number pool based on the seed.

3. The system of claim 1, wherein the subset comprises a set of telephone numbers with the smallest Hamming distance from the seed.

4. The system of claim 1, wherein the seed comprises a mnemonic seed.

5. The system of claim 4, wherein the mnemonic seed comprises one of: (i) a functional mnemonic phrase; (ii) a selection of characters from a functional mnemonic phrase; and (iii) a homophonic combination of a functional mnemonic phrase.

6. The system of claim 1, wherein the seed comprises one or more of: a user's first name, a user's last name, a user's account username, a user's date of birth, a user's ZIP code, and a user's latitude and longitude pair.

7. The system of claim 1, wherein the subset is further filtered based on location information for a mobile communications device associated with a user, wherein the telephone numbers have an area code for a geographic region determined based on the location information.

8. The system of claim 1, wherein the seed associated with a telephone number is displayed with the telephone number for selection by a user.

9. A method of assigning a telephone number to a user account in a communications system, the method comprising:
obtaining a seed from a user account variable;
obtaining a subset of telephone numbers, wherein each alphanumeric representation of respective telephone numbers in the subset is within a threshold Hamming distance of the seed;
receiving an indication of a selected telephone number from the subset; and
assigning the selected telephone number to the user account.

10. The method of claim 9, wherein the subset is filtered from a global telephone number pool based on the seed.

11. The method of claim 9, wherein the subset comprises a set of telephone numbers with the smallest Hamming distance from the seed.

12. The method of claim 9, wherein the seed comprises a mnemonic seed comprising one or more of: a functional mnemonic phrase; a selection of characters from a functional mnemonic phrase; and a homophonic combination of a functional mnemonic phrase.

13. The method of claim 9, wherein the seed comprises one or more of: a user's first name, a user's last name, a user's account name, a user's date of birth, a user's ZIP code, and a user's latitude and longitude pair.

14. The method of claim 9, further comprising obtaining an area code, and wherein the subset is further filtered based on the area code.

15. The method of claim 14, wherein obtaining the area code comprises
obtaining location information for a communications device associated with the user account; and
determining the area code for a geographic region associated with the location information.

16. The method of claim 10, further comprising reserving, in the global telephone number pool, the telephone numbers in the subset.

17. The method of claim 16, further comprising responsive to reserving the telephone numbers in the subset, tracking a predetermined period of time.

18. The method of claim 17, further comprising:
if the indication of the selected telephone number is prior to the predetermined period of time elapsing:
assigning the selected telephone number to the user account; and
releasing other telephone numbers in the subset back to the global telephone number pool; and
if the selected telephone number is not received prior to the predetermined period of time elapsing:
expiring the predetermined period of time; and
releasing all the telephone numbers in the subset back to the global telephone number pool.

19. The method of claim 9, further comprising displaying the subset of telephone numbers at a communications device with the respective seed used to generate the telephone numbers.

20. A server for assigning a telephone number to a user account in a communications system, the server comprising:

a memory;

a communications interface;

a processor interconnected with the memory and the communications interface, the processor configured to:

obtain a subset of telephone numbers, wherein each alphanumeric representation of respective telephone numbers in the subset is within a threshold Hamming distance of a seed obtained from a user account variable;

receive an indication of a selected telephone number from the subset; and assign the selected telephone number to the user account.

* * * * *